(12) United States Patent
Osakabe (10) Patent No.: US 7,038,997 B2
(45) Date of Patent: May 2, 2006

(54) OPTICAL DISK WITH PRERECORDED CONTROL INFORMATION

(75) Inventor: Katsuichi Osakabe, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 820 days.

(21) Appl. No.: 10/058,953

(22) Filed: Jan. 28, 2002

(65) Prior Publication Data

US 2002/0150394 A1    Oct. 17, 2002

(30) Foreign Application Priority Data

Feb. 2, 2001  (JP) .............................. 2001-026609

(51) Int. Cl.
*G11B 5/09* (2006.01)
*G11B 7/24* (2006.01)

(52) U.S. Cl. .............................. 369/275.1; 369/47.46; 369/47.36; 369/53.44

(58) Field of Classification Search ............. 369/275.1, 369/275.2, 275.4, 275.3, 47.1, 47.28, 47.37, 369/53.1, 59.1
See application file for complete search history.

(56) References Cited

U.S. PATENT DOCUMENTS 6,201,784 B1 * 3/2001 Maeda .................... 369/59.25
6,212,143 B1 * 4/2001 Teshirogi et al. ........ 369/47.45

FOREIGN PATENT DOCUMENTS

JP        2000-260078        9/2000

* cited by examiner

*Primary Examiner*—Muhammad Edun
(74) *Attorney, Agent, or Firm*—Pillsbury Winthrop Shaw Pittman LLP (57) ABSTRACT

An optical disk has a central axis and a major face extending in a radial direction from the central axis. The optical disk is rotatable around the central axis at an angular velocity and is formed with a recording layer on the major face. The recording layer is optically recordable with information and is formed with a track area containing tracks which are arranged at a predetermined track pitch in the radial direction and which are accessable by an optical beam to read or write information while the tracks move at a linear velocity relative to the optical beam. The recording layer is preliminarily recorded with control information indicative of the predetermined track pitch and/or either of a predetermined linear velocity of the tracks or a predetermined angular velocity of the disk. The control information is readily readable from the recording layer to facilitate the accessing of the tracks by the optical beam.

45 Claims, 7 Drawing Sheets

| TNO | POINT | MIN | SEC | FRAME | ZERO | P MIN | P SEC | P FRAME |
|---|---|---|---|---|---|---|---|---|
| 00 | | 00 ~ 99 | 00 ~ 59 | 00 ~ 74 | 00 | | | |
| 8 | 8 | 8 | 8 | 8 | 8 | 8 | 8 | 8 (BITS) |

FIG.10

OPTICAL DISK WITH PRERECORDED CONTROL INFORMATION

BACKGROUND OF THE INVENTION

1. Field of the Invention

The present invention relates to an optical disk and an optical disk apparatus for readily acquiring information about the disk itself such as a track pitch, a recording linear velocity and a recording angular velocity of the loaded optical disk during recording or reproduction.

2. Description of the Related Art

During recording or reproduction of disks with a constant recording linear velocity, it is beneficial to acquire beforehand the target recording linear velocity of an optical disk to be used. When the disk stops at a certain position in the radial direction and then restarts rotating, it is possible to accurately set an adequate rotational speed of the disk for providing the target recording linear velocity, if the same is acquired previously. The target recording linear velocity can be reached in a short time. If there are previously acquired both of the track pitch and the recording linear velocity, it is possible to accurately set a track jump target distance (or a target feed amount of an optical pickup) toward a destination address to be accessed, and an adequate rotational speed of the disk for providing the target recording linear velocity at the access destination. This enables an access to the target position in a short time and to promptly start recording or reproduction.

Likewise, during recording or reproduction of disks with a constant recording angular velocity, it is also beneficial to acquire beforehand the target recording angular velocity of an optical disk to be used. When the disk stops and then starts rotating, the target recording angular velocity can be resumed in a short time. If there are previously acquired both of the track pitch and the recording angular velocity of an optical disk to be used, it is possible to accurately set a track jump target distance (or a target feed amount of an optical pickup) toward a destination address to be accessed. This enables an access to the target position in a short time and to promptly start recording or reproduction.

There is a case of adjusting the time axis correction amount for a recording signal or the laser beam's recording power according to the recording linear velocity. The recording linear velocity must be previously recognized to set the time axis correction amount.

Figure 2:
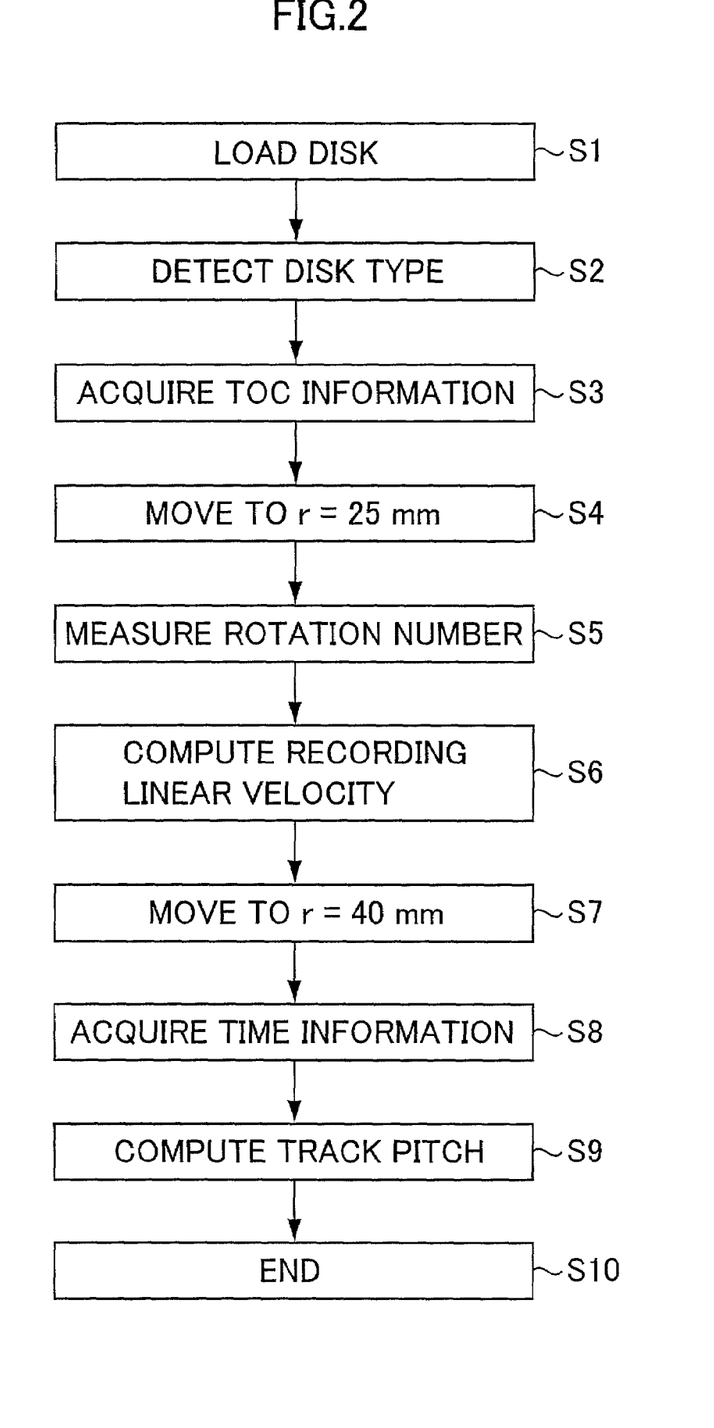
FIG. 2 is a flowchart exemplifying a control procedure for acquiring track pitch information and recording linear velocity information when an optical disk of a constant recording linear velocity mode is loaded on a conventional optical disk apparatus.

A flowchart in FIG. 2 is used to exemplify a procedure for acquiring information about a track pitch and a recording linear velocity when an optical disk of a constant recording linear velocity mode is loaded on a conventional optical disk apparatus (e.g., CD-R/RW drive apparatus). When the optical disk is loaded (S1), a disk type (CD-ROM, CD-R, CD-RW, etc.) is detected (S2) and the TOC (Table of Contents) information is acquired (S3). Then, an optical pickup is moved to a position within a radius of 25 mm, i.e., a start position of a program region (S4). At this position, a spindle motor is controlled to acquire a specified wobble frequency or RF frequency. The spindle motor's rotation number is measured at that time (S5). Based on this measurement result, the recording linear velocity is computed (S6). Thereafter, the optical pickup moves to a position within a radius of 40 mm, i.e., a middle of the program region (S7). The time information at that position is acquired (S8). The track pitch is computed based on that time information and the previously acquired recording linear velocity (S9). Thus, the information about the track pitch and the recording linear velocity has been acquired (S10).

The conventional optical disk apparatus spends a lot of time for preparing for recording or reproduction because loading the optical disk necessitates complicated processing as shown in FIG. 2.

SUMMARY OF THE INVENTION

The present invention has been made in consideration of the foregoing. It is therefore an object of the present invention to provide an optical disk and an optical disk apparatus for fast acquiring information about the disk itself such as a track pitch, a recording linear velocity and a recording angular velocity of the optical disk during recording or reproduction.

The optical disk according to the present invention records preliminarily (during a disk manufacturing process) the track pitch information and/or the recording linear velocity information or the recording angular velocity information as control information about the optical disk itself. Just by reading the disk, it is possible to acquire these types of information. Accordingly, it is possible to eliminate the need for measurement, to acquire these types of information in a short time, and to shorten the time for preparing for recording or reproduction. This optical disk can preliminarily record identification information for the track pitch information and/or the recording linear velocity information or the recording angular velocity information as well. It is possible to record the track pitch and/or the recording linear velocity or the recording angular velocity with a small amount of information by composing the track pitch information and/or the recording linear velocity information or the recording angular velocity information out of code information corresponding to discrete numeric values for the track pitch and/or the recording linear velocity or the recording angular velocity.

For example, the track pitch information and/or the recording linear velocity information or the recording angular velocity information can be recorded in a lead-in region, a program region, or a lead-out region. Especially for a recordable optical disk, such control information can be recorded by frequency modulation or as a pre-pit in a wobbling guide groove. For a read-only optical disk, the control information can be recorded as main information or subcode information. In addition to the lead-in region, the program region, and the lead-out region, a mirror area radially inward of a track formation area can be used to record that information by section of a bar code arranged in the circumferential direction of the disk. This method is applicable to recordable optical disks and read-only optical disks. Further, in the case of a recordable optical disk, that information can be recorded on a track radially inward of a power calibration region by frequency modulation or as a pre-pit in the wobbling guide groove, or as main information, subcode information, etc.

A groove for guiding a track is formed in a wobbling manner on the optical disk according to the present invention with a specified frequency. Specified information is recorded in the guide groove of the optical disk (CD-R, CD-RW, etc.) by the frequency modulation. A combination of highest-order bits for respective digits in the BCD code represents a specified value on that optical disk. The aforementioned specified information is recorded so that low-order bits of the BCD code represent the track pitch information and/or the recording linear velocity information or the recording angular velocity information. In this case, the BCD code comprises 8-bit minute information, second information, and frame information. An undefined combination of highest-order bits for the minute information, second information, and frame information is selected to represent a specific value. The aforementioned specified information can be recorded preliminarily so that low-order bits of the BCD codes represent the track pitch information and/or the recording linear velocity information or the recording angular velocity information. The aforementioned specific value comprises a combination of highest-order bits for the minute information, the second information, and the frame information and can represent any of "001", "010", and "011", for example. It is possible to use an undefined value other than the combination of highest-order bits of the minute information, the second information, and the frame information.

The optical disk according to the present invention is applicable to CD format read-only disks such as CD-DA, CD-ROM, etc., CD format recordable disks such as CD-R, CD-RW, etc., DVD format read-only disks such as DVD-ROM, DVD-video, DVD-Audio, etc., DVD format recordable disks such as DVD-R, DVD+RW, DVD–RW, DVD-RAM, etc., laser disks, magnet optical disks, and other disk-shaped optical recording media.

An optical disk apparatus according to the present invention records or reproduces information on the optical disk according to the present invention. The apparatus comprises: an optical pickup to read a signal from a specified position on the optical disk when it is loaded; an information acquisition section for acquiring the track pitch information and/or the recording linear velocity information or the recording angular velocity information from the read signal; and a control section for performing operations and controls needed for recording or reproduction based on the acquired information. Just by reading the disk, it is possible to acquire these types of information. Accordingly, it is possible to eliminate the need for measurement, to acquire these types of information in a short time, and to shorten the time for preparing for recording or reproduction. When the track pitch information and/or the recording linear velocity information or the recording angular velocity information comprises code information corresponding to discrete numeric values for the track pitch and/or the recording linear velocity or the recording angular velocity, the apparatus further comprises a converter section for converting the code information to numeric values of the track pitch and/or the recording linear velocity or the recording angular velocity. The aforementioned control section can perform operations and controls needed for recording or reproduction based on the converted numeric values.

The optical disk according to the present invention is a recordable optical disk. The information about itself is preliminarily recorded on a track radially inward of the power calibration region or on the track formation area except the track radially inward of the power calibration region. This track formation area includes the program region, the lead-out region, the lead-in region, the PMA region, the PCA region, etc. According to this optical disk, just by reading the disk, it is possible to acquire the information about itself. Accordingly, it is possible to eliminate the need for measurement, acquire the information about itself in a short time, and shorten the time for preparing for recording or reproduction.

DETAILED DESCRIPTION OF THE PREFERRED EMBODIMENTS

Figure 3:
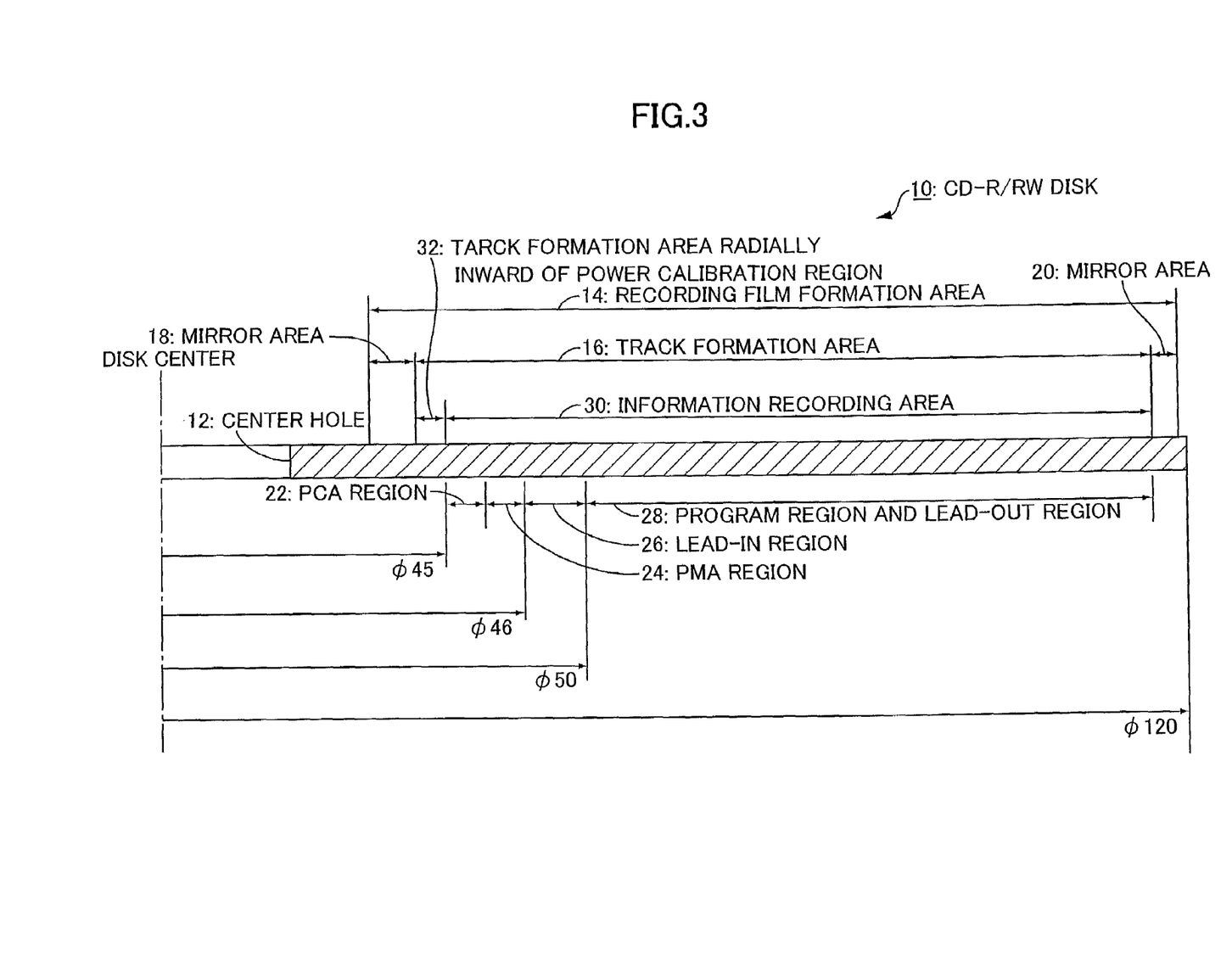
FIG. 3 is a sectional view schematically showing arrangement of areas in the radial direction of a CD-R/RW disk.

The following describes embodiments according to the present invention. First described is a case where the present invention is applied to a CD-R disk or a CD-RW disk (hereafter referred to as a CD-R/RW disk). The arrangement of areas in the radial direction of the CD-R/RW disk is explained with reference to FIG. 3. A CD-R/RW disk 10 has an outside diameter of 120 mm and forms a center hole 12 at the center axis. A recording film formation area 14 is a recordable layer made of a pigment film and a reflective film, and comprises a track formation area 16 and mirror areas 18 and 20. On the track formation area 16, a pre-groove (guide groove) is preliminarily formed as a track. No track is formed on the internal circumference side of the mirror area 18 and on the external circumference side of the mirror area 20. The internal circumference side of the mirror area 18 may comprise only the reflective film without the pigment film. Within a diameter of 45 through 46 mm, there are formed a PCA region (Power calibration region) 22 and a PMA region (Program Memory Area) 24 from the internal circumference side. Within a diameter of 46 through 50 mm, a lead-in region 26 is formed. Between a diameter of 50 mm and the external circumference, a program region and lead-out region 28 is formed. An information recording area 30 comprises the PCA region 22, the PMA region 24, the lead-in region 26, the program region and the lead-out region 28 as a whole. The track formation area 16 is recorded approximately 30 seconds longer than the PCA region 22 toward the internal circumference. A track formation area 32 is formed as a free region radially inward of the PCA region (trial region) 22 and is not used conventionally. The pre-groove wobbles at a specified frequency and records ATIP (Absolute Time In Pre-groove) information by frequency modulation. The ATIP information includes absolute time information at respective positions. Information is recorded in the form of pits along the tracks. The tracks are arranged spirally or concentrically at a predetermined pitch in the radial direction of the optical disk.

Embodiment 1

Figure 4:
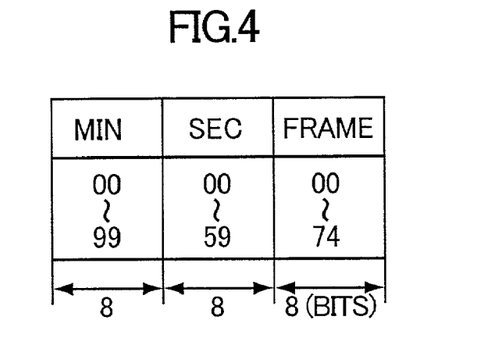
FIG. 4 shows part of an ATIP information format for a lead-in region of the CD-R/RW disk.

The following describes the first embodiment for recording the track pitch information and the recording linear velocity information as ATIP information on the lead-in region 26 during a disk manufacture process. FIG. 4 shows part of the ATIP information format on the lead-in region 26. This format contains time information MIN, SEC, and FRAME corresponding to minute, second, and frame at respective positions. Each information comprises an 8-bit BCD code representing two digits. The maximum value of MIN:SEC:FRAME on the lead-in region 26 is 99:59:74 (10011001:01011001:01110100). Of combinations of highest-order bits for MIN, SEC, and FRAME (M1, S1, F1), values "000" and "100" are used for the time information. Values "101", "110", and "111" are used as identification information for the ATIP special information. Any of the remaining values "001", "010", and "011" is used as identification information for the track pitch information and the recording linear velocity information. In this case, the track pitch information and the recording linear velocity information can be recorded by using low-order bits following highest-order bits in MIN, SEC, and FRAME. The track pitch information and the recording linear velocity information comprise numeric values of the track pitch and the recording linear velocity. In addition, these types of information can comprise code information corresponding to discrete numeric values for the track pitch and the recording linear velocity. This enables the track pitch and the recording linear velocity to be recorded with a small number of bits.

Table 1 shows an example of the recording linear velocity information to be recorded as the ATIP information. Values S2, S3, and S4 correspond to the second, third, and fourth bits, respectively, from the highest-order bit of the 8-bit SEC (second information).

TABLE 1

| S2 | S3 | S4 | Corresponding recording linear velocity |
|---|---|---|---|
| 0 | 0 | 0 | 1.20 m/sec |
| 0 | 0 | 1 | 1.25 m/sec |
| 0 | 1 | 0 | 1.30 m/sec |
| 0 | 1 | 1 | 1.35 m/sec |
| 1 | 0 | 0 | 1.40 m/sec |
| : | | | : |

Table 2 shows an example of the track pitch information to be recorded as the ATIP information. Values F2, F3, and F4 correspond to the second, third, and fourth bits, respectively, from the highest-order bit of the 8-bit FRAME (frame information).

TABLE 2

| F2 | F3 | F4 | Corresponding track pitch |
|---|---|---|---|
| 0 | 0 | 0 | 1.45 μm |
| 0 | 0 | 1 | 1.50 μm |
| 0 | 1 | 0 | 1.55 μm |
| 0 | 1 | 1 | 1.60 μm |
| 1 | 0 | 0 | 1.65 μm |
| : | | | : |

Figure 5:
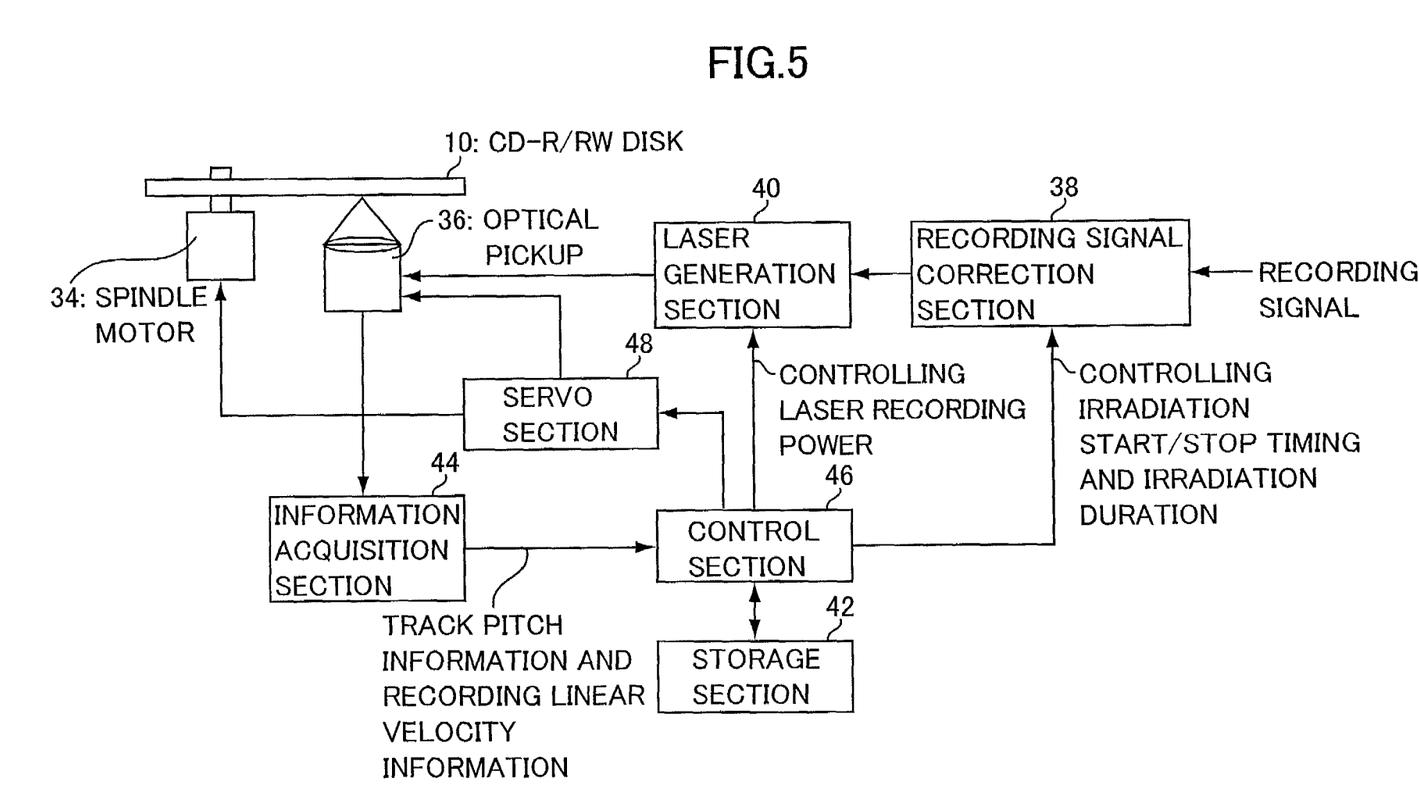
FIG. 5 is a block diagram showing an embodiment which configures the optical disk apparatus according to the present invention as a CD-R/RW drive apparatus.

As mentioned above, the lead-in region 26 of the CD-R/RW disk 10 records the track pitch information and the recording linear velocity information as the ATIP information. FIG. 5 shows an embodiment of the CD-R/RW which records and reproduces information on the CD-R/RW disk 10. A spindle motor 34 rives the CD-R/RW disk 10. An optical pickup 36 records and reproduces information. A signal correction section 38 corrects time axes (irradiation start/stop timing and irradiation time) of a recording signal. A laser generation section 40 drives a laser source in the optical pickup 36 according to a recording signal having the corrected time axes, and records information on the disk 10. A storage section 42 stores: a converting table which represents relationship between a track pitch code and a discrete numeric value for the track pitch corresponding to that code; another converting table which represents relationship between a recording linear velocity code and a discrete numeric value for the recording linear velocity corresponding to that code; a table which represents relationship between a recording linear velocity and the time axis correction amount for the recording signal; and a table which represents relationship between a recording linear velocity and the laser beam's recording power. An information acquisition section 44 acquires the ATIP information and other information (main information, subcode information, information needed for various servos, etc.) based on a returned light receiving signal detected by the optical pickup 36. The ATIP information of the lead-in region contains the track pitch information and the recording linear velocity information in the form of code information.

Based on the code information for the recording linear velocity acquired in the information acquisition section 44, a control section 46 reads a corresponding recording linear velocity value, the time axis correction amount for the recording signal, and the laser beam's recording power from the storage section 42. The time axis correction amount for the read recording signal and the laser beam's recording power are transferred to the recording signal correction section 38 and the laser generation section 40 as instruction values. The recording signal correction section 38 corrects the time axes of the recording signal based on instructions from the control section 46. The laser generation section 40 controls the laser beam's recording power based on an instruction from the control section 46. A servo section 48 is responsible for rotation control of the spindle motor 34, and focus control, tracking control, track jump control, and feed control of the optical pickup 36. When provided with an instruction to access a given address on the disk 10, the control section 46 computes a target rotation number of the spindle motor 34 at the access destination and a track jump target distance to the access destination (or a target feed amount of the optical pickup 36). The computed value is sent as an instruction value to the servo section 48. The servo section 48 controls the rotation number according to the instruction value and performs the track jump control and the feed control of the optical pickup 36.

Figure 1:
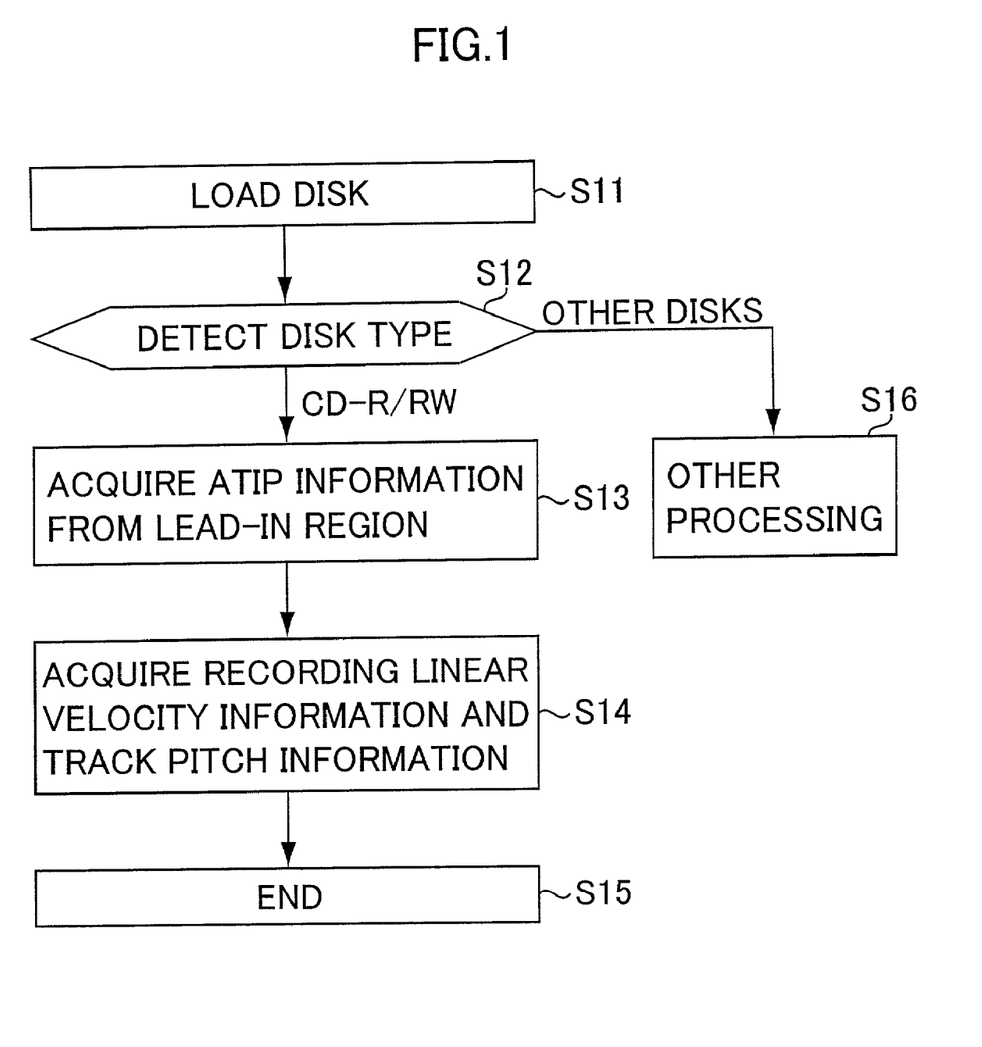
FIG. 1 is a flowchart showing an embodiment 1 according to the present invention and exemplifying a control procedure for acquiring track pitch information and recording linear velocity information from ATIP information when a disk is loaded on a CD-R/RW drive apparatus.

The following exemplifies a control procedure for acquiring the track pitch information and the recording linear velocity information with reference to FIG. 1 when a disk is loaded on the CD-R/RW drive apparatus shown in FIG. 5. When a disk is loaded (S11), it is determined whether a CD-R/RW disk or other disks are loaded according to presence or absence of the ATIP information (S12). When a CD-R/RW disk is used, the ATIP information is read from the lead-in region (S13). The track pitch information and the recording linear velocity information are acquired from the ATIP information (S14). Thus, the information about the track pitch and the recording linear velocity has been acquired (S15). When the other disks are used, another processing is performed (S16).

Embodiment 2

Figure 6:
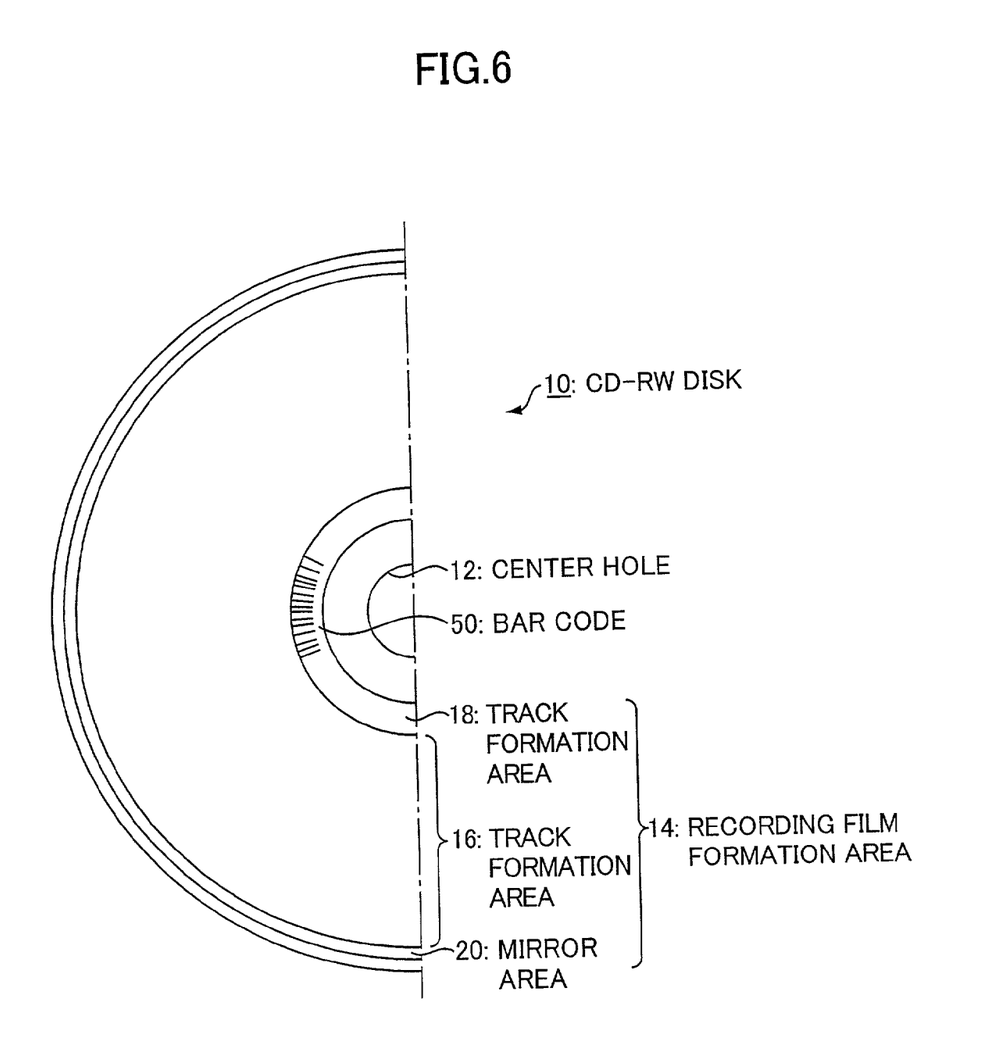
FIG. 6 shows an embodiment 2 according to the present invention, viewed from the recording surface side of the CD-R/RW disk.

FIG. 6 shows an embodiment for recording the track pitch information and the recording linear velocity information on a mirror area radially inward of the track formation area during a disk manufacture process by using a bar code arranged in the circumferential direction. The recording film formation area on the CD-R/RW disk 10 contains the mirror area 18 radially inward of the track formation area 16. The mirror area 18 contains an area which comprises a layer of the pigment film and the reflective film or comprises just the reflective film. This area records the track pitch information and the recording linear velocity information by a section of a bar code 50 arranged in the circumferential direction. Using the CD-R/RW drive apparatus shown in FIG. 5, the optical pickup 36 can read the bar code 50 prior to recording and reproducing of information on this CD-R/RW disk 10.

Figure 7:
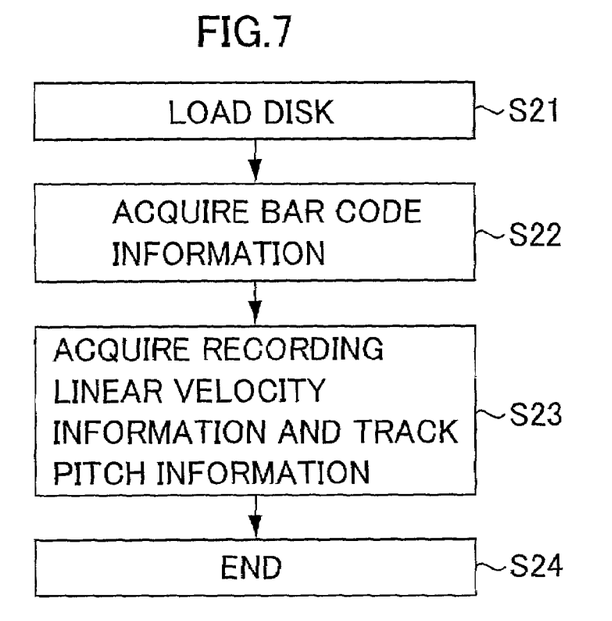
FIG. 7 is a flowchart showing the embodiment 2 according to the present invention and exemplifying a control procedure for acquiring track pitch information and recording linear velocity information from bar code information when a disk is loaded on the CD-R/RW drive apparatus shown in FIG. 5.

The following exemplifies a control procedure for acquiring the track pitch information and the recording linear velocity information from the bar code 50 with reference to FIG. 7 when a disk is loaded on the CD-R/RW drive apparatus shown in FIG. 5. When a disk is loaded (S21), the spindle motor 34 is driven. The optical pickup 36 is positioned to the mirror area 18 toward the internal circumference. The optical pickup 36 reads the bar code 50 (S22). The track pitch information and the recording linear velocity information are acquired from the read bar code information (S23). Thus, the information about the track pitch and the recording linear velocity has been acquired (S24).

This information recording method using the bar code can be applied to not only CD-R/RW disks, but also other standardized recordable optical disks and read-only optical disks. In this case, a disk of the constant recording angular velocity mode can record the recording angular velocity information instead of the recording linear velocity information.

Embodiment 3

The following describes an embodiment for recording the track pitch information and the recording linear velocity information on the track formation area radially inward of the power calibration region during a disk manufacture process. The free track formation area 32 radially inward of the PCA region 22 or the trial region on the CD-R/RW disk 10 in FIG. 3 records the track pitch information and the recording linear velocity information in any form of the ATIP information, the pre-pit information, the EFM signal's main information, the EFM signal's subcode information, and other information. Using the CD-R/RW drive apparatus shown in FIG. 5, the optical pickup 36 can read information from the track formation area 32 radially inward of the PCA region 22 prior to recording and reproducing of information on this CD-R/RW disk 10.

Figure 8:
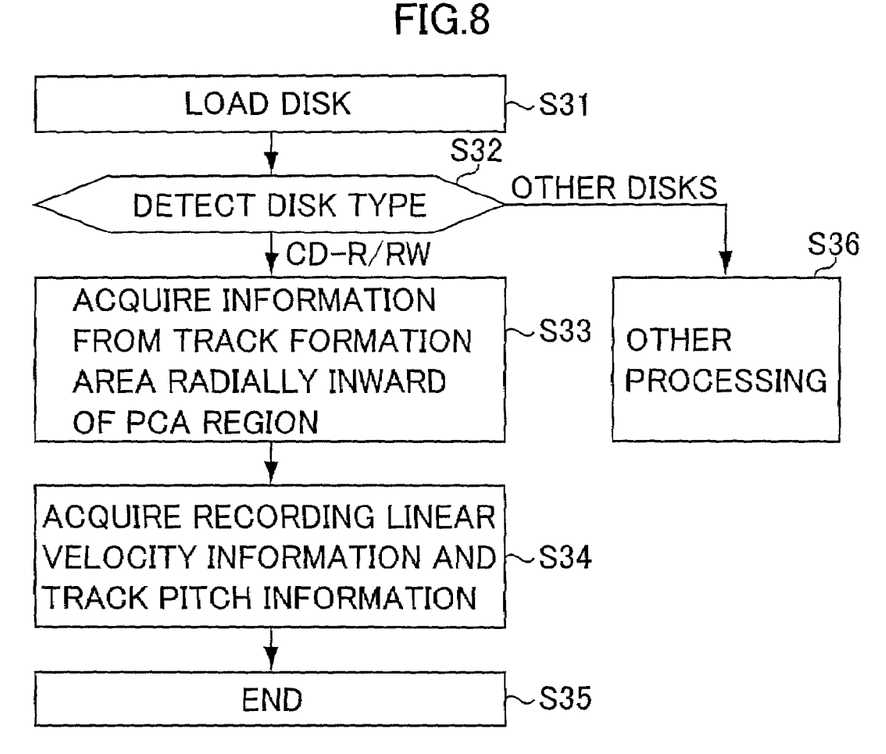
FIG. 8 is a flowchart showing an embodiment 3 according to the present invention and exemplifying a control procedure for acquiring track pitch information and recording linear velocity information from a track formation area radially inward of the PCA region when a disk is loaded on the CD-R/RW drive apparatus shown in FIG. 5.

The following exemplifies a control procedure for acquiring the track pitch information and the recording linear velocity information from the track formation area 32 radially inward of the PCA region 22 with reference to FIG. 8 when a disk is loaded on the CD-R/RW drive apparatus shown in FIG. 5. When a disk is loaded (S31), it is determined whether a CD-R/RW disk or other disks are used according to presence or absence of the ATIP information (S32). When a CD-R/RW disk is used, information is read from the track formation area 32 radially inward of the PCA region 22 (S33). According to this information, the track pitch information and the recording linear velocity information are acquired (S34). Thus, the information about the track pitch and the recording linear velocity has been acquired (S35). When the other disks are used, another processing is performed (S36).

It is possible to apply this information recording method using the track formation area radially inward of the power calibration region to not only CD-R/RW disks, but also other standardized recordable optical disks. A disk of the constant recording angular velocity mode can record the recording angular velocity information instead of the recording linear velocity information. It is possible to record control information needed for recording or reproduction other than the track pitch information, the recording linear velocity information, and the recording angular velocity information.

Embodiment 4

The following describes an embodiment for recording the track pitch information and the recording linear velocity information on the lead-in region during a disk manufacture process. The lead-in region on the optical disk records the track pitch information and the recording linear velocity information provided with an undefined identification code in any form of the ATIP information, the pre-pit information, the main information (for read-only disks), the subcode information (for read-only disks), and other information.

Figure 9:
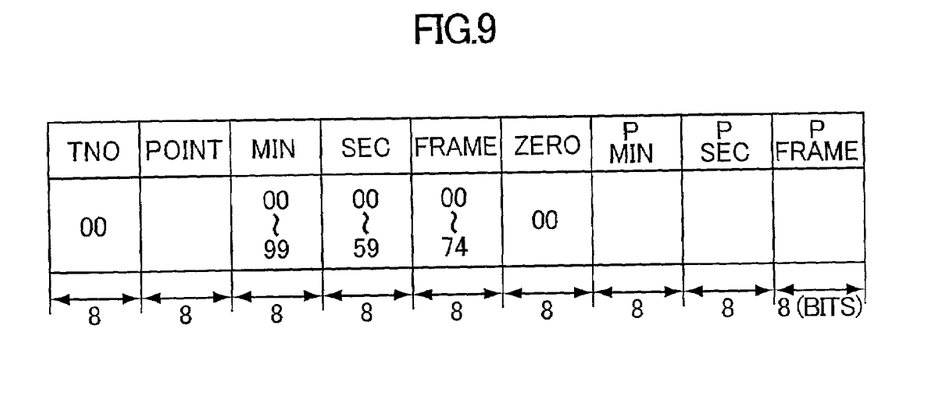
FIG. 9 shows part of a Q subcode information format for an EFM signal from the lead-in region on the CD-R/RW disk.

The following describes a case where the track pitch information and the recording linear velocity information are recorded as the EFM signal's Q subcode information on the lead-in region of a read-only formatted CD such as CD-DA, CD-ROM, etc. FIG. 9 shows part of the Q subcode information format on the lead-in region. This format contains time information MIN, SEC, and FRAME corresponding to minute, second, and frame at respective positions in the lead-in region. Each information comprises an 8-bit BCD code representing two digits. The maximum value of MIN:SEC:FRAME on the lead-in region 26 is 99:59:74 (10011001:01011001:01110100). Of combinations of highest-order bits for MIN, SEC, and FRAME (M1, S1, F1), values "000" and "100" are used for the time information. Any of the remaining values "001", "010", "011", "101", "110", and "111" is used as identification information for the track pitch information and the recording linear velocity information.

In this case, the track pitch information and the recording linear velocity information can be recorded by using low-order bits following highest-order bits in MIN, SEC, and FRAME. The track pitch information and the recording linear velocity information comprise numeric values of the track pitch and the recording linear velocity. In addition, these types of information can comprise code information corresponding to discrete numeric values for the track pitch and the recording linear velocity. This enables the track pitch and the recording linear velocity to be recorded with a small number of bits.

The recording linear velocity information can be recorded as the EFM signal's subcode information likewise the data shown in the aforementioned Table 1, for example. The track pitch information can be recorded as the EFM signal's subcode information likewise the data shown in the aforementioned Table 2, for example.

Using the CD-R/RW drive apparatus shown in FIG. 5 or a read-only disk drive such as a CD-ROM drive, a DVD-ROM drive, etc., the optical pickup can read control information from the lead-in region prior to recording and reproducing of information on this read-only formatted CD.

Figure 10:
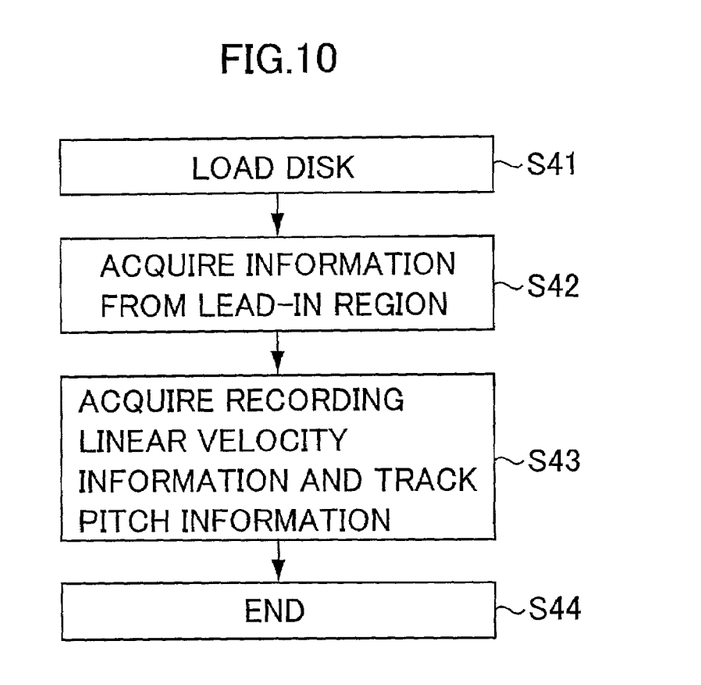
FIG. 10 is a flowchart showing an embodiment 4 according to the present invention and exemplifying a control procedure for acquiring track pitch information and recording linear velocity information from the lead-in region when a disk is loaded on the CD-R/RW drive apparatus shown in FIG. 5 or a read-only disk drive apparatus.

The following exemplifies a control procedure for acquiring the track pitch information and the recording linear velocity information with reference to FIG. 10 when a disk is loaded on the CD-R/RW drive apparatus shown in FIG. 5 or the read-only disk drive. When a disk is loaded (S41), information is read from the lead-in region (S42). The track pitch information and the recording linear velocity information are acquired from the information which is read from the lead-in region (S43). Thus, the information about the track pitch and the recording linear velocity has been acquired (S44).

The track pitch information and the recording linear velocity information can be recorded on the information recording area except the lead-in region such as the program region or the lead-out region. It is possible to apply the method of recording control information about the disk itself using the information recording area including the lead-in region, the program region, the lead-out region, etc. to not only CD format disks, but also other standardized recordable optical disks and read-only optical disks. In this case, a disk of the constant recording angular velocity mode can record the recording angular velocity information instead of the recording linear velocity information.

What is claimed is:

1. An optical disk having a central axis and a major face extending in a radial direction from the central axis, the optical disk being rotated around the central axis controllably at an angular velocity or a linear velocity and being formed with a recording layer on the major face, the recording layer being optically recordable with information and being formed with a track area containing tracks which are arranged at a predetermined track pitch in the radial direction and which are accessible by an optical beam to read or write information, wherein the recording layer is preliminarily recorded with control information indicative of the predetermined track pitch, the control information being readily readable from the recording layer to facilitate the accessing of the tracks by the optical beam.

2. The optical disk according to claim 1, wherein the control information further indicates either of a predetermined linear velocity or a predetermined angular velocity, which can be also readily read from the recording layer to facilitate the accessing of the tracks by the optical beam.

3. The optical disk according to claim 1, wherein the control information is recorded in the form of a code corresponding to a discrete numerical value of the predetermined track pitch.

4. The optical disk according to claim 1, wherein the track area includes a program region for recording contents information, a lead-in region preceding the program region in a progression direction of the accessing by the optical beam and recording the control information, and a lead-out region succeeding the program region in a progression direction of the accessing by the optical beam.

5. The optical disk according to claim 1, wherein the recording layer is divided into the track area and a reflective area free of tracks and arranged radially inward of the track area, and wherein the control information is recorded on the reflective area in the form of a bar code arranged in a circumferential direction of the optical disk.

6. The optical disk according to claim 1, wherein the track area is divided into a program region where contents information can be written for recording, a trial region where trial writing can be performed before writing of the contents information, and a free region provided radially inward of the trial region, and wherein the control information is recorded in the tracks of the free region.

7. The optical disk according to claim 1, being selected from a group consisting of read-only disks of CD format including CD-DA and CD-ROM, recordable disks of CD format including CD-R and CD-RW, read-only disks of DVD format including DVD-ROM, DVD-video and DVD-Audio, recordable disks of DVD format including DVD-R, DVD+RW, DVD–RW and DVD-RAM, laser disks, magnet optical disks, and other disk-shaped optical recording media.

8. An optical disk having a central axis and a major face extending in a radial direction from the central axis, the optical disk being rotated around the central axis controllably at an angular velocity or a linear velocity being formed with a recording layer, the recording layer being optically recordable with information and being formed with a track area containing tracks which are arranged at a predetermined track pitch in the radial direction and which are accessible by an optical beam to read or write information, wherein the optical disk is recorded with control information during a disk manufacturing process, the control information being indicative of a predetermined linear velocity and being readily readable from the recording layer to facilitate the accessing of the tracks by the optical beam.

9. The optical disk according to claim 8, wherein the control information further indicates the predetermined track pitch, which can be also readily read from the recording layer to facilitate the accessing of the tracks by the optical beam.

10. The optical disk according to claim 8, wherein the control information is recorded in the form of a code, the code being corresponding to one of discrete numerical values of the linear velocity.

11. The optical disk according to claim 8, wherein the track area includes a program region for recording contents information, a lead-in region preceding the program region in a progression direction of the accessing by the optical beam and being recorded with the control information, and a lead-out region succeeding the program region in a progression direction of the accessing by the optical beam.

12. The optical disk according to claim 8, wherein the recording layer is divided into the track area and a reflective area, the reflective area being free of tracks and arranged radially inward of the track area, and wherein the control information is recorded on the reflective area in the form of a bar code arranged in a circumferential direction of the optical disk.

13. The optical disk according to claim 8, wherein the track area is divided into a program region where contents information can be written for recording, a trial region where trial writing can be performed before writing of the contents information, and a free region provided radially inward of the trial region, and wherein the control information is recorded in the tracks of the free region.

14. The optical disk according to claim 8, being selected from a group consisting of read-only disks of CD format including CD-DA and CD-ROM, recordable disks of CD format including CD-R and CD-RW, read-only disks of DVD format including DVD-ROM, DVD-video and DVD-Audio, recordable disks of DVD format including DVD-R, DVD+RW, DVD–RW and DVD-RAM, laser disks, magnet optical disks, and other disk-shaped optical recording media.

15. An optical disk having a central axis and a major face extending in a radial direction from the central axis, the optical disk being rotated around the central axis controllably at an angular velocity or a linear velocity and being formed with a recording layer, the recording layer being optically recordable with information and being formed with a track area containing tracks which are arranged at a predetermined track pitch in the radial direction and which are accessible by an optical beam to read or write information, wherein the optical disk is recorded with control information during a disk manufacturing process, the control information being indicative of a predetermined angular velocity and being readily readable from the recording layer to facilitate the accessing of the tracks by the optical beam.

16. The optical disk according to claim 15, wherein the control information further indicates the predetermined track pitch, which can be also readily read from the recording layer to facilitate the accessing of the tracks by the optical beam.

17. The optical disk according to claim 15, wherein the control information is recorded in the form of a code, the code being corresponding to one of discrete numerical values of the angular velocity.

18. The optical disk according to claim 15, wherein the track area includes a program region for recording contents information, a lead-in region preceding the program region in a progression direction of the accessing by the optical beam and being recorded with the control information, and a lead-out region succeeding the program region in a progression direction of the accessing by the optical beam.

19. The optical disk according to claim 15, wherein the recording layer is divided into the track area and a reflective areas, the reflective area being free of tracks and arranged radially inward of the track area, and wherein the control information is recorded on the reflective area in the form of a bar code arranged in a circumferential direction of the optical disk.

20. The optical disk according to claim 15, wherein the track area is divided into a program region where contents information can be written for recording, a trial region where trial writing can be performed before writing of the contents information, and a free region provided radially inward of the trial region, and wherein the control information is recorded in the tracks of the free region.

21. The optical disk according to claim 15, being selected from a group consisting of read-only disks of CD format including CD-DA and CD-ROM, recordable disks of CD format including CD-R and CD-RW, read-only disks of DVD format including DVD-ROM, DVD-video and DVD-Audio, recordable disks of DVD format including DVD-R, DVD+RW, DVD–RW and DVD-RAM, laser disks, magnet optical disks, and other disk-shaped optical recording media.

22. An optical disk having a central axis and a major face extending in a radial direction from the central axis, the optical disk being rotated around the central axis controllably at an angular velocity or a linear velocity and being formed with a recording layer on the major face, the recording layer being optically recordable with information and being formed with a track area containing tracks which are arranged at a predetermined track pitch in the radial direction and which are accessible by an optical beam to read or write information, further the recording layer being formed with a groove for guiding the optical beam along the tracks, the groove being wobbled such that information can be preliminarily recorded along the groove in the form of a sequence of BCD codes by FM modulation, wherein the recording layer is preliminarily recorded with control information readily readable to facilitate the accessing of the tracks by the optical beam, the control information indicating the predetermined track pitch and/or either of a predetermined linear velocity of the tracks or a predetermined angular velocity of the tracks, the control information being recorded as a particular set of BCD codes having a specific combination of respective most significant bits such that lesser bits of the respective BCD codes indicate a value of the control information.

23. The optical disk according to claim 22, wherein the BCD codes are each composed of 8 bits and include first BCD codes indicating minute information, the second BCD codes indicating second information and third BCD codes indicating frame information, and wherein the particular set of BCD codes is composed of a particular set of a minute BCD code, a second BCD code and a frame BCD code such that the particular set has the specific combination of the most significant bits of the respective minute BCD code, second BCD code and frame BCD code.

24. The optical disk according to claim 23, wherein the specific combination of the most significant bits of the minute BCD code, second BCD code and frame BCD code is selected from "0,0,1", "0,1,0" and 0,1,1".

25. The optical disk according to claim 22, being selected from a group consisting of read-only disks of CD format including CD-DA and CD-ROM, recordable disks of CD format including CD-R and CD-RW, read-only disks of DVD format including DVD-ROM, DVD-video and DVD-Audio, recordable disks of DVD format including DVD-R, DVD+RW, DVD–RW and DVD-RAM, laser disks, magnet optical disks, and other disk-shaped optical recording media.

26. An optical disk having a central axis and a major face extending in a radial direction from the central axis, the optical disk being rotated around the central axis controllably an angular velocity or a linear velocity and being formed with a recording layer on the major face, the recording layer being optically recordable with information and being formed with a track area containing tracks which are arranged at a predetermined track pitch in the radial direction and which are accessible by an optical beam to read or write information, the track area being divided into a program region where contents information can be written for recording, a trial region where trial writing can be performed before writing of the contents information, and a free region provided radially inward of the trial region, wherein the recording layer is preliminarily recorded with control information in the tracks of the free region, such that the control information is readily readable to facilitate the accessing of the tracks by the optical beam.

27. An optical disk having a central axis and a major face extending in a radial direction from the central axis, the optical disk being rotated around the central axis controllably at an angular velocity or a linear velocity and being formed with a recording layer on the major face, the recording layer being optically recordable with information and being formed with a track area containing tracks which are arranged at a predetermined track pitch in the radial direction and which are accessible by an optical beam to read or write information, the track area including a program region for recording contents information, a lead-in region preceding the program region in a progression direction of the accessing by the optical beam, a lead-out region succeeding the program region in a progression direction of the accessing by the optical beam and a PMA region, wherein control information is recorded in the track area at any of the program region, the lead-in region, the lead-out region and the PMA region, such that the control information is readily readable from the track area to facilitate the accessing of the tracks by the optical beam.

28. An apparatus for carrying out either reproducing of information or recording of information on an optical disk, the apparatus comprising:

a drive section that is provided for rotationally driving an optical disk having a central axis and a major face extending in a radial direction from the central axis, the optical disk being formed with a recording layer on the major face, the recording layer being optically recordable with information and being formed with a track area containing tracks which are arranged at a predetermined track pitch in the radial direction, the recording layer being preliminarily recorded with control information indicative of the predetermined track pitch;

an optical pickup that is provided for accessing the recording layer by an optical beam to read information when the optical disk is driven;

an acquisition section that is provided for acquiring the control information indicative of the predetermined track pitch from the information read by the optical pickup; and a control section that operates based on the acquired control information for controlling the drive section and the optical pickup to perform either the reproducing of information or the recording of information.

29. The apparatus according to claim 28, wherein the control information is recorded in the form of a code corresponding to a discrete numerical value of the predetermined track pitch, and wherein the apparatus further comprises a converter for converting the code into the numerical value of the predetermined track pitch so as to enable the control section to control the drive section and the optical pickup.

30. An apparatus for carrying out either reproducing of information or recording of information on an optical disk by means of an optical beam, the apparatus comprising: a drive section that is provided for rotationally driving an optical disk at a predetermined linear velocity relative to the optical beam, the optical disc having a central axis and a major face extending in a radial direction from the central axis and being formed with a recording layer, the optical disk being optically recordable on the recording layer with information and being recorded with control information during a disk manufacturing process, the control information being indicative of the predetermined linear velocity; an optical pickup that is provided for accessing the recording layer by the optical beam to read information when the optical disk is driven; an acquisition section that is provided for acquiring the control information which is indicative of the predetermined linear velocity from the information read by the optical pickup; and a control section that operates based on the acquired control information for controlling the drive section and the optical pickup to maintain the predetermined linear velocity during either the reproducing of information or the recording of information.

31. The apparatus according to claim 30, wherein the control information is recorded in the form of a code which is corresponding to one of discrete numerical values of the linear velocity, and wherein the apparatus further comprises a converter for converting the code into the numerical value of the predetermined linear velocity so as to enable the control section to control the drive section and the optical pickup.

32. An apparatus for carrying out either reproducing of information or recording of information on an optical disk, the apparatus comprising: a drive section that is provided for rotationally driving an optical disk at a predetermined angular velocity, the optical disc having a central axis and a major face extending in a radial direction from the central axis and being formed with a recording layer, the optical disk being optically recordable on the recording layer with information and being preliminarily recorded with control information during a disk manufacturing process, the control information being indicative of the predetermined angular velocity; an optical pickup that is provided for accessing the recording layer by the optical beam to read information when the optical disk is driven; an acquisition section that is provided for acquiring the control information which is indicative of the predetermined angular velocity from the information read by the optical pickup; and a control section that operates based on the acquired control information for controlling the drive section and the optical pickup to maintain the predetermined angular velocity during either the reproducing of information or the recording of information.

33. The apparatus according to claim 32, wherein the control information is recorded in the form of a code which is corresponding to one of discrete numerical value of the angular velocity, and wherein the apparatus further comprises a converter for converting the code into the numerical value of the predetermined linear velocity so as to enable the control section to control the drive section and the optical pickup.

34. An apparatus for carrying out either reproducing of information or recording of information on an optical disk by means of an optical beam, the apparatus comprising:

a drive section that is provided for rotationally driving an optical disk controllably at an angular velocity or a linear velocity, the optical disk having a central axis and a major face extending in a radial direction from the central axis and being formed with a recording layer on the major face, the recording layer being optically recordable with information and being formed with a track area containing tracks which are accessible by the optical beam to read or write information, further the recording layer being formed with a groove for guiding the optical beam along the tracks, the groove being wobbled such that information can be preliminarily recorded along the groove in the form of a sequence of BCD codes by FM modulation, the recording layer being preliminarily recorded with control information as a particular set of BCD codes having a specific combination of respective most significant bits such that lesser bits of the respective BCD codes indicate a discrete numerical value of the control information, the control information indicating the predetermined track pitch and/or either of a predetermined linear velocity of the tracks or a predetermined angular velocity of the tracks;

an optical pickup that is provided for accessing the recording layer by the optical beam to read information when the optical disk is driven;

an acquisition section that is provided for acquiring the control information as the particular set of BCD codes from the information read by the optical pickup; and a control section that operates based on the acquired control information for controlling the drive section and the optical pickup to perform either the reproducing of information or the recording of information.

35. The apparatus according to claim 34, further comprising a converter for converting the particular set of BCD codes into the numerical value of the control information so as to enable the control section to control the drive section and the optical pickup.

36. An apparatus for carrying out either reproducing of information or recording of information on an optical disk, the apparatus comprising:
a drive section that is provided for rotationally driving an optical disk having a central axis and a major face extending in a radial direction from the central axis, the optical disk being formed with a recording layer on the major face, the recording layer being optically recordable with information and being formed with a track area containing tracks which are arranged at a predetermined track pitch in the radial direction, the track area being divided into a program region where contents information can be written for recording, a trial region where trial writing can be performed before writing of the contents information, and a free region provided radially inward of the trial region such that control information is preliminarily recorded in the tracks of the free region;
an optical pickup that is provided for accessing the tracks by an optical beam to read information when the optical disk is driven;
an acquisition section that is provided for acquiring the control information from the information read by the optical pickup; and
a control section that operates based on the acquired control information for controlling the drive section and the optical pickup to perform either the reproducing of information or the recording of information.

37. An optical disk having a central axis and a major face extending in a radial direction from the central axis, the optical disk being rotated around the central axis controllably at an angular velocity or a linear velocity and being formed with a recording layer, the recording layer being optically recordable with information and being formed with a track area containing tracks which are arranged at a predetermined track pitch in the radial direction and which are accessible by an optical beam to read or write information, wherein the optical disk is recorded with control information during a disk manufacturing process, the control information being indicative of the predetermined track pitch and being readily readable from the recording layer to facilitate the accessing of the tracks by the optical beam.

38. The optical disk according to claim 37, wherein the control information further indicates either of a predetermined linear velocity or a predetermined angular velocity, which can be also readily read from the recording layer to facilitate the accessing of the tracks by the optical beam.

39. The optical disk according to claim 37, wherein the control information is recorded in the form of a code, the code being corresponding to one of discrete numerical values of the track pitch.

40. The optical disk according to claim 37, wherein the track area includes a program region for recording contents information, a lead-in region preceding the program region in a progression direction of the accessing by the optical beam and being recorded with the control information, and a lead-out region succeeding the program region in a progression direction of the accessing by the optical beam.

41. The optical disk according to claim 37, wherein the recording layer is divided into the track area and a reflective area, the reflective area being free of tracks and arranged radially inward of the track area, and wherein the control information is recorded on the reflective area in the form of a bar code arranged in a circumferential direction of the optical disk.

42. The optical disk according to claim 37, wherein the track area is divided into a program region where contents information can be written for recording, a trial region where trial writing can be performed before writing of the contents information, and a free region provided radially inward of the trial region, and wherein the control information is recorded in the tracks of the free region.

43. The optical disk according to claim 37, being selected from a group consisting of read-only disks of CD format including CD-DA and CD-ROM, recordable disks of CD format including CD-R and CD-RW, read-only disks of DVD format including DVD-ROM, DVD-video and DVD-Audio, recordable disks of DVD format including DVD-R, DVD+RW, DVD–RW and DVD-RAM, laser disks, magnet optical disks, and other disk-shaped optical recording media.

44. An apparatus for carrying out either reproducing of information or recording of information on an optical disk, the apparatus comprising: a drive section that is provided for rotationally driving an optical disk having a central axis and a major face extending in a radial direction from the central axis, the optical disk being formed with a recording layer, the recording layer being optically recordable with information and being formed with a track area containing tracks which are arranged at a predetermined track pitch in the radial direction, the optical disk being recorded with control information during a disk manufacturing process, the control information being indicative of the predetermined track pitch; an optical pickup that is provided for accessing the recording layer to read or write information by an optical beam when the optical disk is driven; an acquisition section that is provided for acquiring the control information from the information read by the optical pickup; and a control section that operates based on the acquired control information for controlling the drive section and the optical pickup to perform either the reproducing of information or the recording of information.

45. The apparatus according to claim 44, wherein the control information is recorded in the form of a code, the code being corresponding to one of discrete numerical values of the track pitch, and wherein the apparatus further comprises a converter for converting the code into the numerical value of the predetermined track pitch so as to enable the control section to control the drive section and the optical pickup.

* * * * *